United States Patent
Räsänen

(10) Patent No.: US 9,820,183 B2
(45) Date of Patent: Nov. 14, 2017

(54) USER PLANE CONGESTION CONTROL

(71) Applicant: NOKIA SOLUTIONS AND NETWORKS OY, Espoo (FI)

(72) Inventor: Juha Antero Räsänen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/772,800

(22) PCT Filed: Mar. 4, 2013

(86) PCT No.: PCT/EP2013/054253
§ 371 (c)(1),
(2) Date: Sep. 4, 2015

(87) PCT Pub. No.: WO2014/135185
PCT Pub. Date: Sep. 12, 2014

(65) Prior Publication Data
US 2016/0014635 A1    Jan. 14, 2016

(51) Int. Cl.
*H04W 28/02* (2009.01)
*H04L 12/801* (2013.01)
(Continued)

(52) U.S. Cl.
CPC ......... *H04W 28/0289* (2013.01); *H04L 47/12* (2013.01); *H04L 47/14* (2013.01); *H04L 47/32* (2013.01); *H04W 76/00* (2013.01)

(58) Field of Classification Search
CPC ......... H04L 47/10; H04L 47/14; H04L 47/32; H04L 47/266; H04L 47/2475;
(Continued)

(56) References Cited

U.S. PATENT DOCUMENTS 6,021,438 A * 2/2000 Duvvoori ............ G06F 21/105
709/224
2006/0190603 A1* 8/2006 Anzai ................ H04L 12/2854
709/226
(Continued)

FOREIGN PATENT DOCUMENTS

EP      2 560 430 A1    2/2013
WO   WO 2013/000516 A1   1/2013

OTHER PUBLICATIONS

3GPP "Minutes of 3GPP TSG SA WG1 Meeting #58"; Seville, Spain May 7-11, 2012; S1-122005; 3GPP TSG-SA WG1 Meeting #59; Chicago, USA, Jul. 30-Aug. 3, 2012; pp. 1-74; 3rd Generation Partnership Project (3GPP); Mobile Competence Centre; 650, Route des Lucioles; F-06921 Sophia-Antipolis Cedex; France.
(Continued)

*Primary Examiner* — Mohamed Kamara
(74) *Attorney, Agent, or Firm* — Squire Patton Boggs (US) LLP

(57) ABSTRACT

The present invention provides methods, apparatuses and computer program product relating to user plane congestion control. The present invention includes receiving, at a network entity, an indication that there is a congestion in at least one network element in a network, receiving, at the network entity, information indicating an internet protocol address of at least one user equipment located in the congested network, and preventing, by the network entity, a setup and/or continuation of at least one application of the at least one user equipment using the at least one network element in the network if it is determined that there is a congestion in the network.

17 Claims, 7 Drawing Sheets

(51) Int. Cl.
*H04L 12/823* (2013.01)
*H04W 76/00* (2009.01)

(58) Field of Classification Search
CPC ............... H04W 12/00; H04W 12/569; H04W 12/2602; H04W 28/02; H04W 28/04; H04W 28/08; H04W 28/12; H04W 28/16; H04W 28/0273; H04W 28/0289; H04W 76/00; H04W 76/027; H04W 24/00; H04W 24/02; H04W 24/2602; H04W 4/005; H04W 80/00; H04W 60/00
See application file for complete search history.

(56) References Cited

U.S. PATENT DOCUMENTS

| | | | | |
|---|---|---|---|---|
| 2009/0196182 A1* | 8/2009 | Barnett | ............... | H04L 47/10 370/236.1 |
| 2011/0002224 A1* | 1/2011 | Tamura | ............... | H04L 47/10 370/236 |
| 2011/0261695 A1* | 10/2011 | Zhao | ............... | H04W 28/10 370/232 |
| 2013/0021933 A1* | 1/2013 | Kovvali | ............ | H04W 28/0236 370/252 |
| 2013/0294236 A1* | 11/2013 | Beheshti-Zavareh | ... | H04L 47/22 370/235 |
| 2013/0329632 A1* | 12/2013 | Buyukkoc | ............... | H04W 4/00 370/328 |
| 2014/0019638 A1* | 1/2014 | Kurabayashi | ......... | G06F 9/5072 709/235 |

OTHER PUBLICATIONS

3GPP TR 22.805 V0.3.1 (May 2012) "3rd Generation Partnership Project; Technical Specification Group SA; Feasibility Study on User Plane Congestion Management (Release 12)"; pp. 1-32; 3rd Generation Partnership Project (3GPP); Mobile Competence Centre; 650, Route des Lucioles; F-06921 Sophia-Antipolis Cedex; France.

3GPP TS 23.203 V11.8.0 (Dec. 2012) "3rd Generation Partnership Project; Technical Specification Group Services and System Aspects; Policy and charging control architecture (Release 11)"; pp. 1-179; 3rd Generation Partnership Project (3GPP); Mobile Competence Centre; 650, Route des Lucioles; F-06921 Sophia-Antipolis Cedex; France.

3GPP TSG SA2 "[Draft] LS response on notification of IP/Ports and codec for rSRVCC"; S2-121433; 3GPP TSG-SA WG2 Meeting #90; Apr. 16-20, 2012, Bratislava, Slovakia; 1 page; 3rd Generation Partnership Project (3GPP); Mobile Competence Centre; 650, Route des Lucioles; F-06921 Sophia-Antipolis Cedex; France.

International Search Report and Written Opinion dated Jun. 7, 2013 corresponding to International Patent Application No. PCT/EP2013/054253.

3GPP TS 29.212 V11.6.0 (Sep. 2012), Technical Specification, 3rd Generation Partnership Project; Technical Specification Group Core Network and Terminals; Policy and Charging Control (PCC); Reference points (Release 11), Sep. 2012, 194 pages.

Nokia Siemens Networks, "Key issue 4: Roles of Standalone TDF and PCRF," 3GPP Draft; TD S2-104941, 3GPP TSG SA WG2 Meeting #81, Oct. 11-15, 2010, Prague, Czech Republic, 4 pages.

* cited by examiner

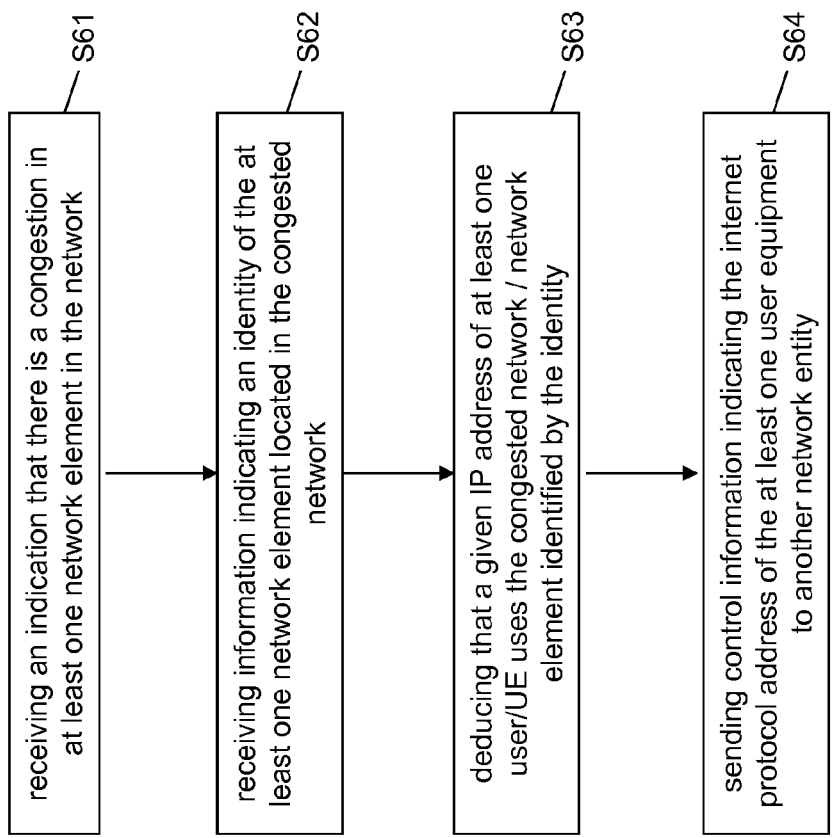

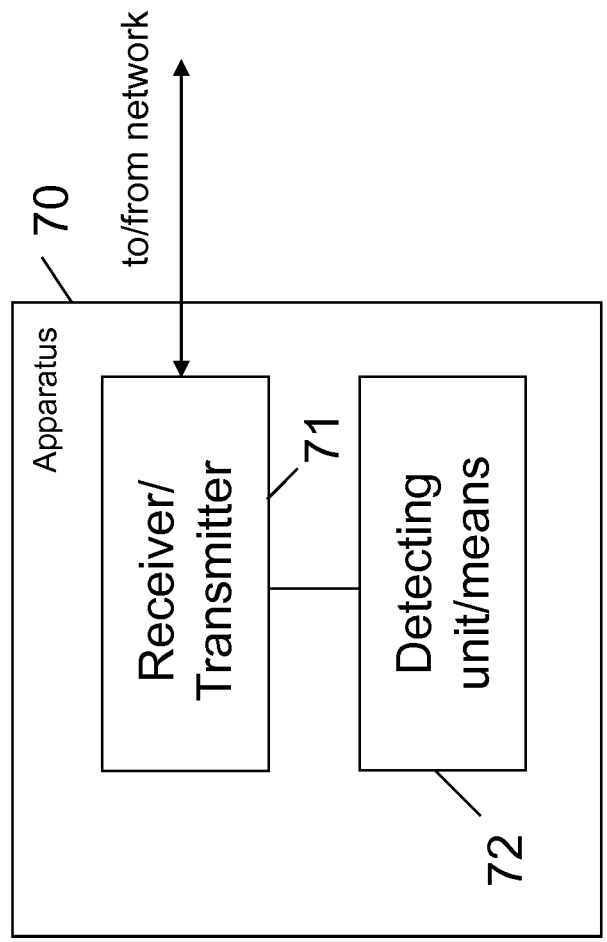

USER PLANE CONGESTION CONTROL

FIELD OF THE INVENTION

The present invention relates to user plane congestion control. In particular, the present invention relates to apparatuses, methods and a program for user plane congestion control.

BACKGROUND OF THE INVENTION

Currently, the 3rd Generation Partnership Project (3GPP) Service and System Aspects Working Group 1 (SA1) is creating service requirements and use cases for user plane congestion management, as set out e.g. in document [1]. New use cases comprise e.g.:
Use Case 8—Servicing data connection requests/reactivations
Allows the network to identify if the application that initiated a data connection on the UE is an "attended" or a "non-attended" type (i.e. web surfing vs. social network app's periodic updates).
Use Case 11—Multiple applications traffic control over one bearer
Highlights the problem of only using a single PDP context to carry different types of traffic.
Use Case 12—Application Data Priority Control
Operator may want to offer higher priority treatment in the operator network for the applications which are owned by the operator than others owned by service providers, even if the type for the applications is the same, e.g. the IP Multimedia (IM) application belonging to the operator might have higher priority than those belonging to the 3rd party.
Use Case 13—Protocol Optimization
Operators may expect the network to provide protocol optimization capability by using common protocol optimization mechanisms, e.g. Hyper Text Transfer Protocol (HTTP) Multi-Part Response, HTTP Pipelining, Robust Header Compression (ROHC), etc.

FIG. 1 is an overview showing the overall policy and charging control (PCC) architecture as described in document [3], to which the present invention is applicable. According to document [3], the PCC functionality is comprised by the functions of the Policy and Charging Enforcement Function (PCEF), the Bearer Binding and Event Reporting Function (BBERF), the Policy and Charging Rules Function (PCRF), the Application Function (AF), the Traffic Detection Function (TDF), the Online Charging System (OCS), the Offline Charging System (OFCS) and the Subscription Profile Repository (SPR) or the User Data Repository (UDR).

As defined in document [3], the TDF is a functional entity that performs application detection and reporting of detected application and its service data flow description to the PCRF. The TDF supports solicited application reporting and/or unsolicited application reporting.

The TDF shall detect Start and Stop of the application traffic for the ADC rules that the PCRF has activated at the TDF (solicited application reporting) or which are pre-provisioned at the TDF (unsolicited application reporting). The TDF shall report, unless the notification is muted for the specific ADC Rule in case of solicited application reporting, to the PCRF:
For the Start of application event trigger: the Application identifier and, when service data flow descriptions are deducible, the application instance identifier and the service data flow descriptions to use for detecting that application traffic with a dynamic PCC rule.
For the Stop of application event trigger: the Application identifier and if the application instance identifier was reported for the Start, also the application instance identifier.

For solicited application reporting, the PCRF can request the TDF to also perform enforcement actions and usage monitoring.

For unsolicited application reporting, the TDF performs only application detection and reporting functionality but neither enforcement actions nor usage monitoring. The TDF should handle each IPv4 address and IPv6 prefix, assuming the max prefix length used in the access network, within a separate TDF session. The PCRF shall, if needed, correlate TDF sessions that correspond to the same IP-CAN session.

As an option to the architectural solution for TDF in FIG. 1, the PCEF can be enhanced with application detection and control feature, i.e. the TDF can be integrated in the same entity with the PCEF, or collocated with the PCEF in the same entity.

Further background information in this regard and additional use cases can be found in documents [1] and [2], for example.

REFERENCES

[1]: SA1 meeting report SA1#58, May 2012
[2]: 3GPP TR 22.805 V0.3.1, May 2012
[3]: 3GPP TS 23.203 V11.8.0, December 2012

SUMMARY OF THE INVENTION

It is therefore an object of the present invention to overcome the above drawbacks and to provide methods, apparatuses and a program for user plane congestion control.

According to an aspect of the present invention there is provided a method comprising:
receiving, at a network entity, an indication that there is a congestion in at least one network element in a network,
receiving, at the network entity, information indicating an internet protocol address of the at least one user equipment located in the congested network, and
preventing, by the network entity, a setup and/or continuation of at least one application of the at least one user equipment using the at least one network element in the network if it is determined that there is a congestion in the network.

According to further refinements of the present invention as defined under the above aspect
preventing the setup of the at least one application includes
detecting an application start event related to the internet protocol address of the at least one user equipment using the at least one network element,
reporting the detection of the application start event to a network control entity,
receiving, from the network control entity, an instruction to drop the application start event if it is determined that the application start event belongs to an application the setup of which is not allowed if it is determined that there is a congestion in the network, and
dropping the application start event;
preventing the setup of the at least one application includes
receiving, at the network entity, information indicating the at least one application, the setup and/or continuation of which is not allowed if it is determined that there is a congestion in the network, and rejecting the application start event if it is determined that the application start event belongs to an application the setup of which is not allowed if it is determined that there is a congestion in the network;

preventing the continuation of the at least one application includes receiving, at the network entity, information indicating at least one application, the setup and/or continuation of which is not allowed if it is determined that there is a congestion in the network, and blocking traffic of the at least one application to/from the network address of the at least one network element;

blocking traffic of the at least one application to/from the internet protocol address of the at least one user equipment using the network element is made temporarily, and cancelling blocking, if it is determined that the congestion in the network is alleviated;

According to another aspect of the present invention there is provided a method comprising:

receiving, at a network entity, an indication that there is a congestion in at least one network element in a network, receiving, at the network entity, information indicating an identity of the at least one network element located in the congested network, deducing that a given internet protocol address of at least one user equipment uses the congested network element identified by the identity, and sending control information indicating the internet protocol address of the at least one user equipment to another network entity.

According to further refinements of the present invention as defined under the above aspects the congestion in the network relates to a congestion in a radio cell or a congestion in another network element, to which the at least one network element is attached;

the at least one application, the setup or continuation of which is prevented, is indicated on a per user/subscription basis;

a priority order is assigned to the at least one application or the at least one user equipment;

criteria for preventing the setup or continuation of the at least one application include at least one of a capacity required by the at least one application and a status of the at least one application;

the network entity is a traffic detection function;

the traffic detection function is integrated in a policy and charging enforcement function;

the network entity is a policy and charging rules function and the another network entity is a traffic detection function.

According to another aspect of the present invention there is provided an apparatus comprising:

a receiver configured to receive an indication that there is a congestion in at least one network element in a network, and to receive information indicating an internet protocol address of at least one user equipment located in the congested network, and a preventing unit configured to prevent a setup and/or continuation of at least one application of the at least one user equipment using the at least one network element in the network if it is determined that there is a congestion in the network.

According to further refinements of the present invention as defined under the above aspect preventing the setup of the at least one application by the preventing unit includes detecting an application start event related to the internet protocol address of the at least one user equipment using the at least one network element, reporting the detection of the application start event to a network control entity, receiving, from the network control entity, an instruction to drop the application start event if it is determined that the application start event belongs to an application the setup of which is not allowed if it is determined that there is a congestion in the network, and dropping the application start event;

preventing the setup of the at least one application by the preventing unit includes receiving information indicating the at least one application, the setup and/or continuation of which is not allowed if it is determined that there is a congestion in the network, and rejecting the application start event if it is determined that the application start event belongs to an application the setup of which is not allowed if it is determined that there is a congestion in the network;

preventing the continuation of the at least one application by the preventing unit includes receiving information indicating at least one application, the setup and/or continuation of which is not allowed if it is determined that there is a congestion in the network, and blocking traffic of the at least one application to/from the network address of the at least one network element;

blocking traffic of the at least one application to/from the internet protocol address of the at least one user equipment using the network element is made temporarily, and cancelling blocking, if it is determined that the congestion in the network is alleviated;

According to another aspect of the present invention there is provided an apparatus comprising:

a receiver configured to receive an indication that there is a congestion in at least one network element in a network, and information indicating an identity of the at least one network element located in the congested network, a detecting unit configured to deduce that a given internet protocol address of at least one user equipment uses the congested network element identified by the identity, and a transmitter configured to send control information indicating the internet protocol address of the at least one user equipment to another network entity.

According to further refinements of the present invention as defined under the above aspects the congestion in the network relates to a congestion in a radio cell or a congestion in another network element, to which the at least one network element is attached;

the at least one application, the setup or continuation of which is prevented, is indicated on a per user/subscription basis;

a priority order is assigned to the at least one application or the at least one user equipment;

criteria for preventing the setup or continuation of the at least one application include at least one of a capacity required by the at least one application and a status of the at least one application;

the apparatus is a traffic detection function;

the traffic detection function is integrated in a policy and charging enforcement function;

the apparatus is a policy and charging rules function and the another network entity is a traffic detection function.

According to another aspect of the present invention there is provided an apparatus comprising:
  means for receiving an indication that there is a congestion in at least one network element in a network,
  means for receiving information indicating an internet protocol address of at least one user equipment located in the congested network, and
  means for preventing a setup and/or continuation of at least one application of the at least one user equipment using the at least one network element in the network if it is determined that there is a congestion in the network.

According to another aspect of the present invention there is provided an apparatus comprising:
  means for receiving, at a network entity, an indication that there is a congestion in at least one network element in a network,
  means for receiving, at the network entity, information indicating an identity of the at least one network element located in the congested network,
  means for deducing that a given internet protocol address of at least one user equipment uses the congested network element identified by the identity, and
  means for sending control information indicating the internet protocol address of the at least one user equipment to another network entity.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which:

FIG. 6 is a flowchart illustrating another method according to certain aspects of the present invention.

FIG. 7 is a block diagram showing another example of an apparatus according to certain aspects of the present invention.

DETAILED DESCRIPTION

Figure 1:
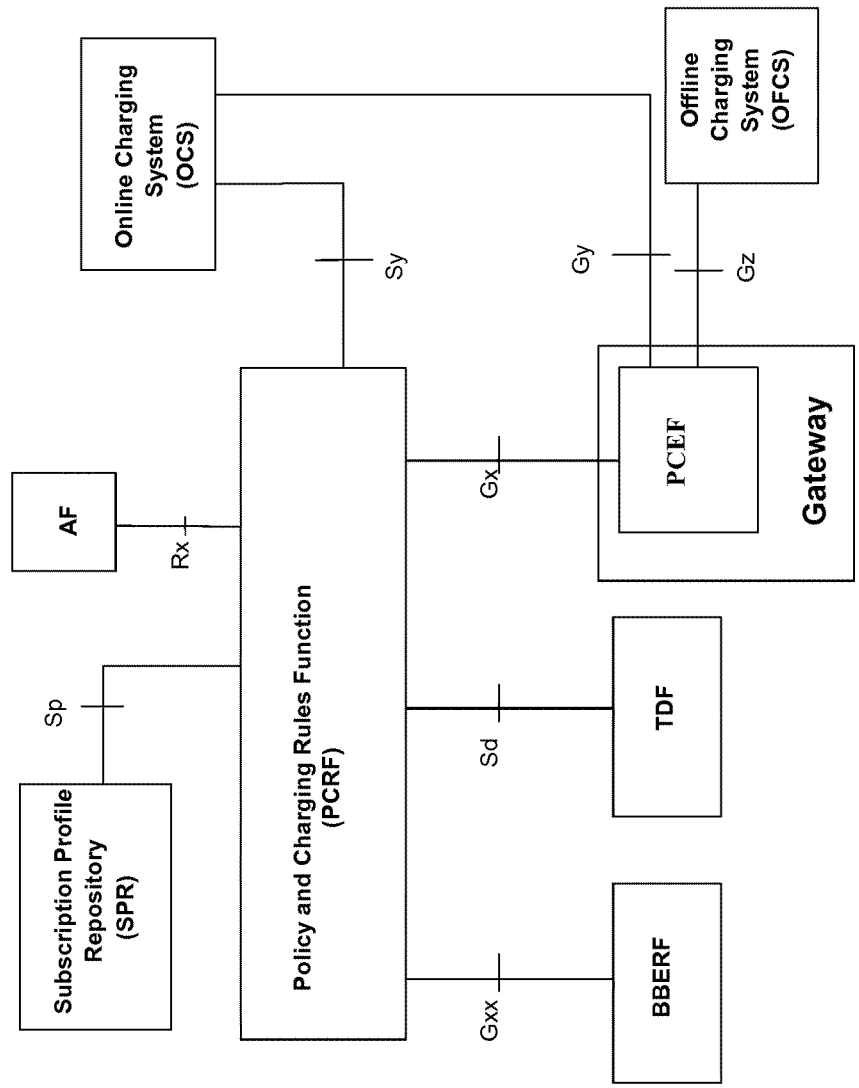
FIG. 1 is an overview showing the overall policy and charging control (PCC) architecture.

In the following, aspects/embodiments of the present invention are described by referring to general and specific examples of the aspects/embodiments, wherein the features of the aspects/embodiments can be freely combined with each other unless otherwise described. It is to be understood, however, that the description is given by way of example only, and that the described aspects/embodiments are by no means to be understood as limiting the present invention thereto.

The present invention addresses the following problems to be solved in order to be able to support some of the above described use cases:
  How to selectively identify and prevent new traffic from being established through a radio cell or other network element suffering from congestion.
  How to selectively identify and reduce existing traffic through a radio cell or other network element suffering from congestion.
  How to implement the prevention of new traffic or reduction of existing traffic gracefully with an end-to-end effect, i.e. without just moving the congestion to another point in the network(s) between the application (client and server) entities.
  How to implement the prevention of new traffic or reduction of existing traffic within a single bearer carrying different service data flows or applications.

In order to solve the above mentioned problems, the present invention provides the following basic principles.

First, a gateway, like e.g. P-GW (packet data network gateway), GGSN (gateway GPRS (general packet radio system) support node) or PCEF (policy and charging enforcement function), finds out that there is congestion in a network, i.e. in a radio cell or in another network element. This may be done either by the gateway itself or the gateway may be informed by another entity.

Then, a traffic detection function (TDF), either integrated/collocated in the PCEF or operating as a standalone entity, is informed about the congestion and possibly about the identity of the congested network element/network. In a standalone TDF case the information may be passed via PCRF (i.e. received by PCRF from another entity, e.g. PCEF or BBERF) or from/by PCRF (e.g. generated or deduced by PCRF) to the TDF. When the TDF is integrated/collocated in the PCEF, the TDF becomes inherently aware of congestion and possibly the related identity of the congested network element/network.

The TDF is also informed about the IP addresses of the terminals/UEs attached to or using the radio cell/network element. In a standalone TDF case this may take place e.g. using the user/UE related control sessions between the PCRF. For control sessions that are established during a congestion situation, the PCRF may e.g. send the congestion information and possibly the related identity information, with the normal session establishment parameters like UE IP address etc, to the TDF within the control session establishment message exchange. For existing control sessions, the PCRF may e.g. send the congestion information and possibly the related identity information to the TDF within a control session modification message exchange, or alternatively, within a general/non-user-specific control message in which case the involved users/UEs shall be identified by including their IP addresses in the message.

In a collocated case, i.e. then TDF and PCEF are integrated in the same entity, the TDF may become inherently aware of the IP addresses of the terminals/UEs (attached to or using the radio cell/network element) through the related IP-CAN session signaling of the PCEF with the access network and PCRF. Alternatively, the same mechanism can be used as for the standalone case above.

The congestion control information and the IP addresses of the terminals/UEs attached to or using the network element, given together to the TDF, enable the TDF to deduce from the IP addresses of the detected traffic/packets whether the traffic/packets (of the user/UE) use the congested network element, and consequently, whether congestion prevention measures can or shall be applied to a given IP address of a user/UE. Alternatively, the TDF may deduce the connection between the congested network entity/network and the impacted/involved users/UEs by comparing the user location information of each user/UE with the identity of the congested network entity/network, if these parameters are made available to the TDF.

The TDF may also be informed, e.g. by PCRF (policy and charging rules function), about the applications or services (application meaning later in the text application and/or service) that should not be allowed to be set up and/or that should be discontinued in a congestion situation. The application may be indicated on a per user/subscription basis. The applications and/or users may also be prioritized, e.g. to define an order in which to start discontinuing or dropping traffic. The PCRF may send application related information to the TDF upon the control message exchange procedures between the PCRF and TDF.

Further criteria for preventing the setup or discontinuing applications could be e.g. the capacity used or required by the application, detected or known by the TDF or indicated to the TDF e.g. by the PCRF. And still further criteria could be the current/prevailing status of the application, which the TDF may get e.g. using deep packet inspection of application traffic.

Now either one or both of two different and independent measures can be applied by the TDF or by the TDF and PCEF together:

Namely, as a first measure according to certain embodiments of the present invention, setup of new traffic is prevented or selectively prevented.

That is, the TDF detects an application START event related to a network address, e.g. an IP address of a UE using the congested cell/network element. TDF reports the "Application START" event to the PCRF (as per current 3GPP specifications), but does not pass the application start packet through before a response from the PCRF. The PCRF may now instruct the TDF/PCEF (e.g. in form of an ADC (application detection and control) rule or PCC (policy and charging control) rule) to drop (i.e. block the sending of) the packet. Only if the PCRF grants a permission (e.g. in form of an ADC rule or PCC rule) the TDF passes the packet through. As an alternative, the TDF/PCEF may make the decisions without dynamically consulting a PCRF, e.g. the required information may be pre-configured in the TDF/PCEF and/or the TDF may have received the required information (e.g. the IP address of the user/UE and the congestion control information including the actions to be taken) earlier e.g. from the PCRF e.g. during the control message exchange that possibly informed the TDF also about the congestion or during another control message exchange between the PCRF and TDF. In order to terminate the application start request gracefully on the application level, the TDF/PCEF may send an application protocol specific "REJECTED" indication backwards towards the sender of the detected "Application START" packet.

Further, as a second measure according to certain embodiments of the present invention, existing traffic is discontinued or selectively discontinued.

In this regard, the TDF/PCEF blocks traffic to/from selected IP addresses. In order to abort/terminate an application gracefully on the application level, the TDF/PCEF may send an application protocol specific "ABORTED/TERMINATED" indication towards the end entities. Alternatively, depending on the application, the blocking may be temporary, i.e. the application is not aborted/terminated, but the traffic is just suspended and the blocking may be removed after alleviation of the congestion situation and the application, e.g. a file transfer operation, may continue. In order to avoid moving the congestion to another point in the network(s) between the application (client and server) entities, the TDF/PCEF may send an application protocol specific "SUSPENDED" indication towards the end entities and a SUSPENSION CANCELLED indication later when the congestion is over.

The prioritization of users/subscriptions and applications can be used for increasing or decreasing the applied measures according to the severity of the prevailing congestion situation.

As to the mapping between the application, the IP address of a user/UE and the congested cell or network entity, the location information of the UE, e.g. the cell ID, is sent by PCEF, BBERF (bearer binding and event reporting function) or GW (gateway) to the PCRF upon IP-CAN session establishment. The location information, e.g. the cell ID, may be updated any time the location is changed. The PCEF, BBERF, or GW may request to be informed, or may automatically/without a specific request be informed, about the location information changes. Hence, the PCRF sees the IP address of the user/UE and the location information of the UE (e.g. a cell ID) to belong to the same IP-CAN session. That is, the PCRF sees a one-to-one mapping between the IP address, the location information (e.g. cell ID) and the IP-CAN session. In a collocated case, i.e. the TDF and PCEF are integrated in the same entity, the TDF may become inherently aware of the mapping information, if/when the information is available to the PCEF.

Thus, according to certain embodiments of the present invention as set out above, Traffic Detection Function (TDF)/Application Detection and Control (ADC) is enhanced to support blocking application start requests and suspending and terminating/aborting applications. PCRF may be enhanced to selectively control the operations.

Several service requirements and use cases of the user plane congestion management study item of 3GPP can be fulfilled with enhancements to operations already existing within the PCEF, TDF and PCRF.

Use cases and service requirements have been specified by 3GPP SA1, as described above and in documents [1] and [2].

In the following, a specific example of the present invention will be described with reference to the drawings.

Figure 2:
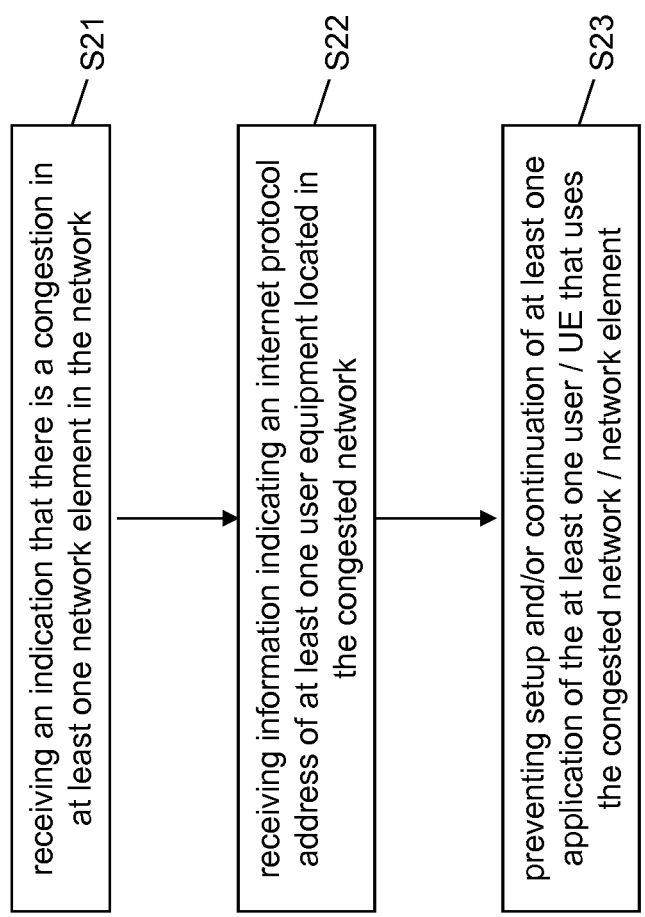
FIG. 2 is a flowchart illustrating a method according to certain aspects of the present invention.

FIG. 2 is a flowchart illustrating a method according to certain aspects of the present invention.

According to an aspect of the present invention, the method comprises receiving in a step S21, at a network entity, an indication that there is congestion in at least one network element in the network, receiving, in a step S22, at the network entity, information indicating an internet protocol address of at least one user equipment located in the congested network, and preventing, in a step S23, by the network entity, a setup and/or continuation of at least one application of the at least one user/UE that uses the congested network/network element. It is to be noted that steps S21 and S22 may occur in any order or be integrated into a single step.

According to certain aspects of the present invention, preventing the setup of the at least one application includes detecting an application start event related to the IP address of a user/UE using the at least one network element, reporting the detection of the application start event to a network control entity, receiving, from the network control entity, an instruction to drop the application start event if it is determined that the application start event belongs to an application the setup of which is not allowed if it is determined that there is a congestion in the network, and dropping the application start event.

According to certain aspects of the present invention, preventing the setup of the at least one application includes receiving from the network control entity instructions for the detection of the application start event and instructions for actions to be taken, e.g. instructions to drop the application start event if it is determined that the application start event belongs to an application the setup of which is not allowed if it is determined that there is a congestion in the network/network element, detecting an application start event related to the IP address of a user/UE using the at least one network/network element, and dropping the application start event.

Further, according to certain aspects of the present invention, preventing the setup of the at least one application includes receiving, at the network entity, information indicating the at least one application, the setup and/or continuation of which is not allowed if it is determined that there is a congestion in the network/network element, and rejecting the application start event if it is determined that the application start event belongs to an application the setup of which is not allowed if it is determined that there is a congestion in the network.

According to certain aspects of the present invention, preventing the continuation of the at least one application includes receiving, at the network entity, information indicating at least one application, the setup and/or continuation of which is not allowed if it is determined that there is a congestion in the network/network element, and blocking traffic of the at least one application to/from the IP address of a user/UE using the at least one network/network element.

According to certain aspects of the present invention, blocking traffic of the at least one application to/from the IP address of a user/UE using the at least one network element is made temporarily, and cancelling blocking, if it is determined that the congestion in the network is alleviated.

According to certain aspects of the present invention, the congestion in the network relates to a congestion in a radio cell or a congestion in another network element like e.g. a radio network controller or an access network gateway, to which the at least one network element is attached.

According to certain aspects of the present invention, the at least one application the setup or continuation of which is prevented, is indicated on a per user/subscription basis.

According to certain aspects of the present invention, a priority order is assigned to the at least one application or the user/UE. For example, the setup and/or continuation of applications with lower priority may be blocked or prevented before the setup and/or continuation of applications with higher priority. Traffic or packets to/from IP addresses of users/UEs with lower priority may be blocked or prevented before the setup and/or continuation of traffic or packets to/from IP addresses of users/UEs with higher priority.

According to certain aspects of the present invention, criteria for preventing the setup or continuation of the at least one application include at least one of a capacity required by the at least one application and a status of the at least one application. The capacity may comprise e.g. a required bit rate on a bearer of a certain QoS (Quality of Service). The status may comprise e.g. the state/phase of the application session, like e.g. a setup phase, negotiation phase, data transfer phase, suspended state/phase, inactive state/phase or terminating phase, which the TDF may detect or deduce e.g. by applying deep packet inspection to the application traffic or packets.

According to certain aspects of the present invention, the network entity is a traffic detection function.

According to certain aspects of the present invention, the traffic detection function is integrated in a policy and charging enforcement function.

As described above, the TDF may operate as a standalone entity or may be integrated/collocated with the PCEF. In the following, specific examples for each of these cases with be described according to certain embodiments of the present invention.

Figure 3:
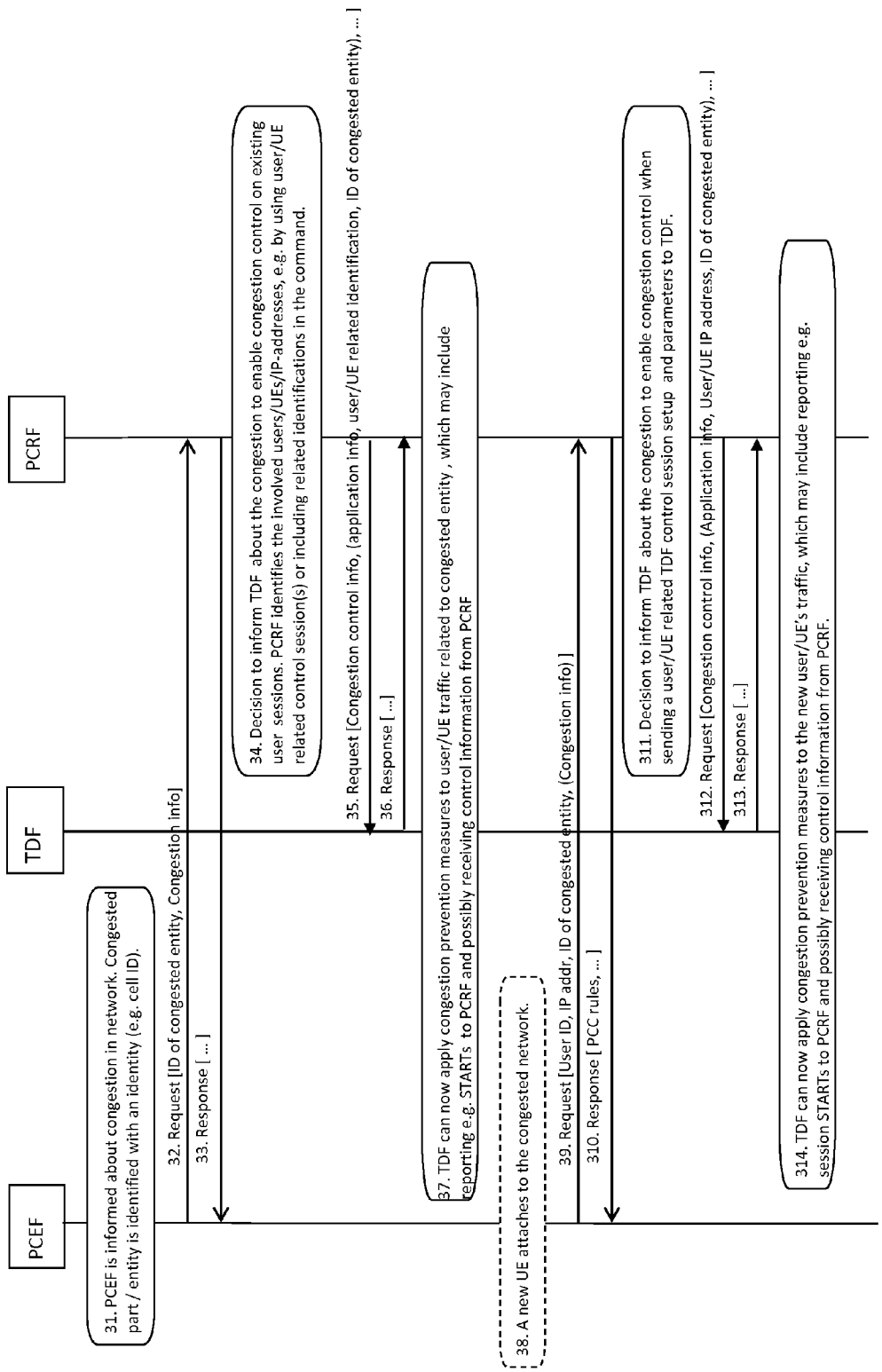
FIG. 3 is a signaling diagram illustrating an example of congestion indication to a standalone TDF according to certain embodiments of the present invention.

FIG. 3 is a signaling diagram illustrating an example of congestion indication to a standalone TDF according to certain embodiments of the present invention.

As shown in FIG. 3, in step 31, the PCEF is informed about congestion in the network. The congested part/network element is identified with an identity, e.g. a cell ID. Then, a request including the ID of the congested element and some congestion information is sent to the PCRF in a step 32. In step 33, the PCRF sends back a response to the PCEF.

In step 34, the PCRF decides to inform the TDF about the congestion so as to enable congestion control on existing user sessions. The PCRF identifies the involved users/UEs/IP addresses, e.g. by using user/UE related control session(s) or including related identifications in the command.

Then, in step 35, the PCRF sends a request including Congestion control information, and optionally application information, user/UE related identification, ID of congested entity, and so on. In step 36, the TDF responds to the request.

Now, the TDF can apply congestion prevention measures to user/UE traffic related to the congested network element, and report e.g. START events to the PCRF and possibly receive control information from the PCRF in step 37.

In step 38, a new UE attaches to the congested network element, and the PCEF sends a request including the user ID, the IP address of the UE, the ID of congested entity which may comprise e.g. the location information of the UE, and may also send some congestion information to the PCRF in step 39, which responds thereto in step 310 with, for example, policy and charging control rules.

Further, in step 311, the PCRF again decides to inform the TDF about the congestion to enable congestion control when sending a user/UE related TDF control session setup and parameters to the TDF. The PCRF sends a request to the TDF in step 312 including some congestion information (e.g. control information for actions to be applied to the detected traffic), possibly application information (e.g. application detection related information like identifiers, addresses and ports) and possibly other related information like the user/UE/IP address and/or the ID of the congested network element, and so on. In step 313, the TDF responds to the request.

In step 314, the TDF can now apply congestion prevention measures to the new user/UE's traffic, which may include reporting e.g. session STARTs to PCRF and possibly receiving control information from PCRF.

Figure 4:
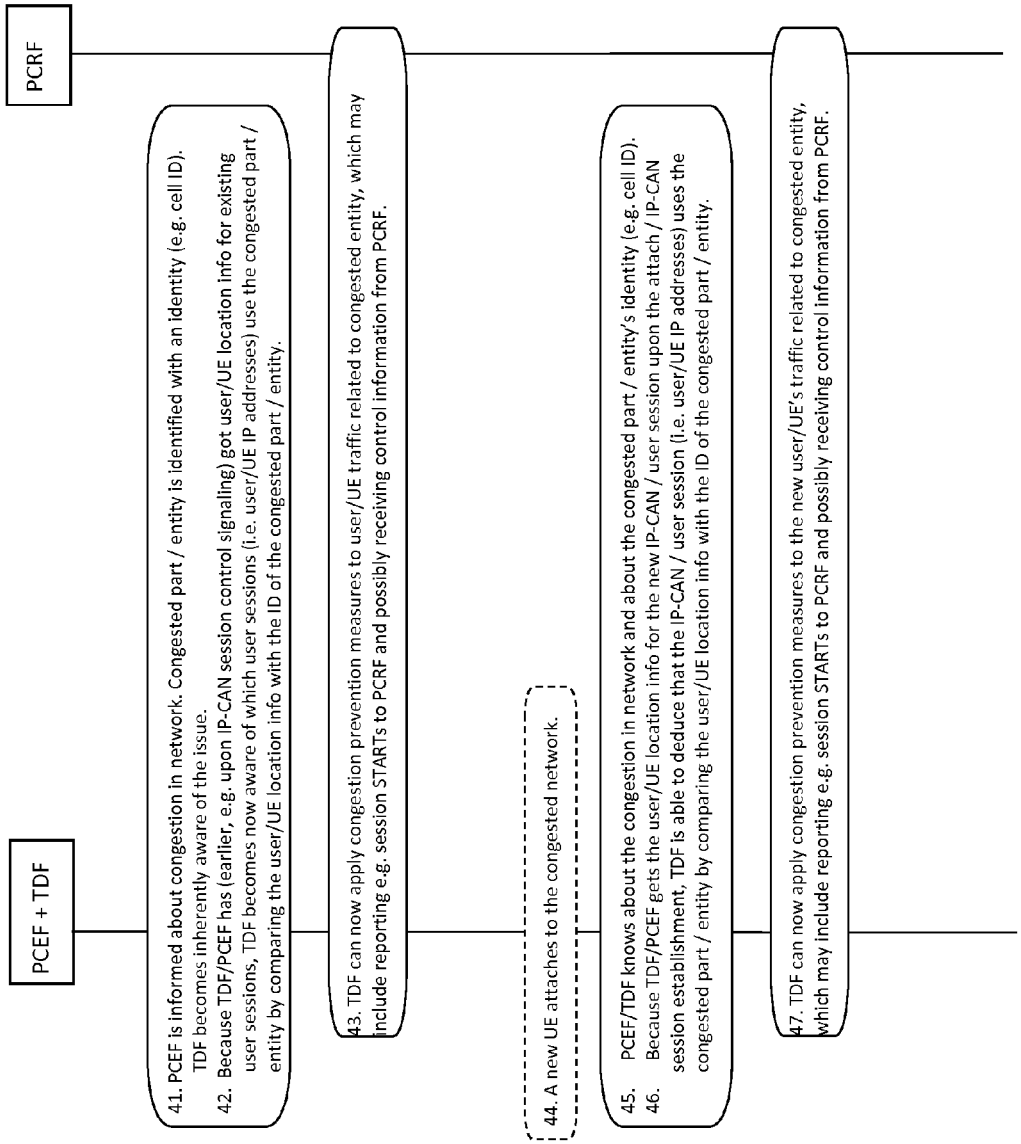
FIG. 4 is a signaling diagram illustrating an example of congestion indication to a TDF collocated with a PCEF according to certain embodiments of the present invention.

FIG. 4 is a signaling diagram illustrating an example of congestion indication to a TDF collocated with a PCEF according to certain embodiments of the present invention.

As shown in FIG. 4, in step 41, the integrated PCEF/TDF, the PCEF is informed about congestion in the network. The congested part/network element is identified with an identity (e.g. cell ID). Thus, the TDF becomes inherently aware of the issue.

Because TDF/PCEF has (earlier, e.g. upon IP-CAN session control signaling) got user/UE location info for existing user sessions, in step 42, the TDF becomes now aware of which user sessions (i.e. user/UE IP addresses) use the congested part/network element by comparing the user/UE location information with the ID of the congested part/network element.

In step 43, the TDF can now apply congestion prevention measures to user/UE traffic related to the congested entity/network element, which may include reporting e.g. session STARTs to PCRF and possibly receiving control information from PCRF.

Further, in step 44, a new UE attaches to the congested network. In step 45, the PCEF/TDF knows about the congestion in network and about the congested part/entity's identity (e.g. cell ID). Because the TDF/PCEF gets the user/UE location information for the new IP-CAN/user session upon the attach/IP-CAN session establishment, the TDF is able to deduce that the IP-CAN/user session (i.e. user/UE IP addresses) uses the congested part/entity by comparing the user/UE location info with the ID of the congested part/entity in step 46.

Thus, in step 47, the TDF can now apply congestion prevention measures to the new user/UE's traffic related to congested entity, which may include reporting e.g. session STARTs to PCRF and possibly receiving control information from PCRF.

Figure 5:
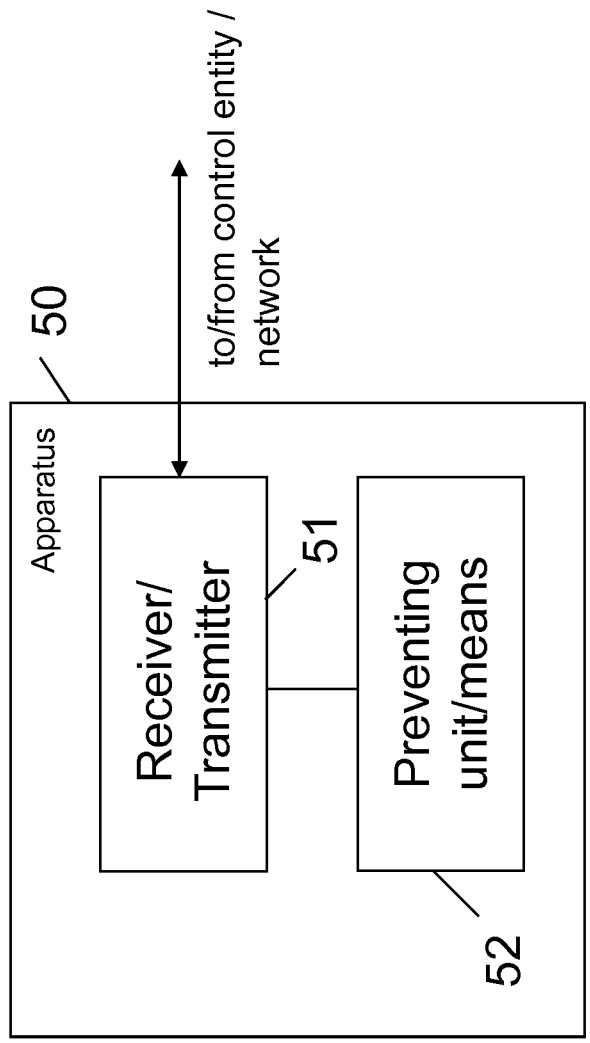
FIG. 5 is a block diagram showing an example of an apparatus according to certain aspects of the present invention.

FIG. 5 is a block diagram showing an example of an apparatus according to certain aspects of the present invention.

According to an aspect of the present invention, the apparatus 50, e.g. a network entity 50 comprises a receiver/transmitter 51 configured to receive an indication that there is a congestion in at least one network element in the network, and to receive control information, user/UE related information and information indicating an internet protocol address of at least one user equipment located in the congested network. Further, the network entity comprises a preventing means/unit 52 configured to prevent setup and/or continuation of at least one application of the at least one user equipment using the at least one network element in the network if it is determined that there is a congestion in the network. Further, it is noted that the detecting means is also configured to detect application traffic/packets and the status/phase of application sessions.

For further functions of the network entity according to further exemplary embodiments of the present invention, reference is made to the above description of a method according to certain embodiments of the present invention, as described in connection with FIG. 2.

FIG. 6 is a flowchart illustrating another method according to certain aspects of the present invention.

According to certain aspects of the present invention, the method comprises receiving an indication that there is a congestion in at least one network element in the network in step S61, and receiving information indicating an identity of the at least one network element located in the congested network in step S62. Further, the method comprises deducing, in a step S63, that a given IP address of at least one user/UE uses the congested network/network element identified by the identity, and sending control information indicating the internet protocol address of the at least one user equipment to another network entity in a step S64.

According to certain aspects of the present invention, the congestion in the network relates to a congestion in a radio cell or a congestion in another network element like e.g. a radio network controller or an access network gateway, to which the at least one network element is attached.

According to certain aspects of the present invention, the network entity is a policy and charging rules function and the another network entity is a traffic detection function.

FIG. 7 is a block diagram showing another example of an apparatus according to certain aspects of the present invention.

According to certain aspects of the present invention, the apparatus 70, e.g. a network entity 70 comprises a receiver/transmitter 71 configured to receive an indication that there is a congestion in at least one network element in a network, and information indicating an identity of the at least one network element located in the congested network. Further, the apparatus comprises a detecting unit 72 configured to deduce that a given internet protocol address of at least one user equipment uses the congested network element identified by the identity. Further, the receiver/transmitter 71 is configured to send control information indicating the internet protocol address of the at least one user equipment to another network entity.

For further functions of the network entity according to further exemplary embodiments of the present invention, reference is made to the above description of a method according to certain embodiments of the present invention, as described in connection with FIG. 6. In the foregoing exemplary description of the apparatus, only the units/means that are relevant for understanding the principles of the invention have been described using functional blocks. The apparatus may comprise further units/means that are necessary for its respective operation. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved; generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

ABBREVIATIONS

3GPP $3^{rd}$ generation partnership project
ADC Application detection and control
BBERF Bearer binding and event reporting function
GW Gateway
IM IP Multimedia
IP Internet protocol
PCC Policy and charging control
PCEF Policy and charging enforcement function
PCRF Policy and charging rules function
P-GW Packet data network gateway
QoS Quality of service
SDF Service data flow
SPR Subscription profile repository
TDF Traffic detection function
TR Technical report
UDR User data repository
UE User equipment

The invention claimed is:

1. A method, comprising:
receiving, at a network entity, an indication that there is a congestion in at least one network element in a network,
receiving, at the network entity, information indicating an internet protocol address of at least one user equipment located in the congested network, and
preventing, by the network entity, a setup and/or continuation of at least one application of the at least one user equipment using the at least one network element in the network if it is determined that there is a congestion in the network,
wherein preventing the setup of the at least one application includes detecting an application start event related to the internet protocol address of the at least one user equipment using the at least one network element.

2. The method according to claim 1, wherein
preventing the setup of the at least one application includes
reporting the detection of the application start event to a network control entity,
receiving, from the network control entity, an instruction to drop the application start event if it is determined that the application start event belongs to an application the setup of which is not allowed if it is determined that there is a congestion in the network, and
dropping the application start event.

3. The method according to claim 1, wherein
preventing the setup of the at least one application includes
receiving, at the network entity, information indicating the at least one application, the setup and/or continuation of which is not allowed if it is determined that there is a congestion in the network, and rejecting the application start event if it is determined that the application start event belongs to an application the setup of which is not allowed if it is determined that there is a congestion in the network.

4. The method according to claim 1, wherein
preventing the continuation of the at least one application includes
receiving, at the network entity, information indicating at least one application, the setup and/or continuation of which is not allowed if it is determined that there is a congestion in the network, and
blocking traffic of the at least one application to/from the network address of the at least one network element.

5. The method according to claim 4, wherein
blocking traffic of the at least one application to/from the internet protocol address of the at least one user equipment using the network element is made temporarily, and
cancelling blocking, if it is determined that the congestion in the network is alleviated.

6. The method according to claim 1, wherein
the congestion in the network relates to a congestion in a radio cell or a congestion in another network element, to which the at least one network element is attached.

7. The method according to claim 1, wherein
the at least one application, the setup or continuation of which is prevented, is indicated on a per user/subscription basis.

8. The method according to claim 1, wherein
a priority order is assigned to the at least one application or the at least one user equipment.

9. The method according to claim 1, wherein
criteria for preventing the setup or continuation of the at least one application include at least one of a capacity required by the at least one application and a status of the at least one application.

10. An apparatus, comprising:
a receiver configured to receive an indication that there is a congestion in at least one network element in a network, and to receive information indicating an internet protocol address of at least one user equipment located in the congested network, and
a preventing unit configured to prevent a setup and/or continuation of at least one application of the at least one user equipment using the at least one network element in the network if it is determined that there is a congestion in the network,
wherein preventing the setup of the at least one application by the preventing unit includes detecting an application start event related to the internet protocol address of the at least one user equipment using the at least one network element.

11. The apparatus according to claim 10, wherein
preventing the setup of the at least one application by the preventing unit includes
reporting the detection of the application start event to a network control entity,
receiving, from the network control entity, an instruction to drop the application start event if it is determined that the application start event belongs to an application the setup of which is not allowed if it is determined that there is a congestion in the network, and
dropping the application start event.

12. The apparatus according to claim 10, wherein
preventing the setup of the at least one application by the preventing unit includes
receiving information indicating the at least one application, the setup and/or continuation of which is not allowed if it is determined that there is a congestion in the network, and
rejecting the application start event if it is determined that the application start event belongs to an application the setup of which is not allowed if it is determined that there is a congestion in the network.

13. The apparatus according to claim 10, wherein
the congestion in the network relates to a congestion in a radio cell or a congestion in another network element, to which the at least one network element is attached.

14. The apparatus according to claim 10, wherein
the at least one application, the setup or continuation of which is prevented, is indicated on a per user/subscription basis.

15. The apparatus according to claim 10, wherein
a priority order is assigned to the at least one application or the at least one user equipment.

16. The apparatus according to claim 10, wherein
criteria for preventing the setup or continuation of the at least one application include at least one of a capacity required by the at least one application and a status of the at least one application.

17. A computer program embodied on a non-transitory computer-readable medium, the computer program, when executed by a processor, causes the processor to:
receive, at a network entity, an indication that there is a congestion in at least one network element in a network,
receive, at the network entity, information indicating an internet protocol address of the at least one user equipment located in the congested network, and
prevent, by the network entity, a setup and/or continuation of at least one application of the at least one user equipment using the at least one network element in the network if it is determined that there is a congestion in the network,
wherein preventing the setup of the at least one application includes detecting an application start event related to the internet protocol address of the at least one user equipment using the at least one network element.

* * * * *